United States Patent [19]

Maguire

[11] 4,179,725

[45] Dec. 18, 1979

[54] CONFORMALLY EPOXY COATED ELECTROLYTE CAPACITOR HAVING AXIAL LEADS

[75] Inventor: David E. Maguire, Greenville, S.C.

[73] Assignee: Union Carbide Corporation, New York, N.Y.

[21] Appl. No.: 834,301

[22] Filed: Sep. 19, 1977

[51] Int. Cl.$^2$ .......................... H01G 9/00; B01J 17/00
[52] U.S. Cl. ..................................... 361/433; 29/570; 174/52 PE; 357/72
[58] Field of Search ....................... 357/72; 361/433; 174/52 PE; 29/570

[56] References Cited

U.S. PATENT DOCUMENTS

| | | | |
|---|---|---|---|
| 2,970,182 | 1/1961 | Miquelis | 361/433 |
| 3,142,886 | 8/1964 | Bronson et al. | 29/570 |
| 3,166,693 | 1/1965 | Haring et al. | 361/433 |
| 3,261,902 | 7/1966 | Pearce et al. | 361/433 |
| 3,301,270 | 1/1967 | Horn | 361/433 |
| 4,035,905 | 7/1977 | Clement | 361/433 |

*Primary Examiner*—Andrew J. James
*Attorney, Agent, or Firm*—Frederick J. McCarthy, Jr.

[57] ABSTRACT

A coated solid tantalum capacitor device having a conformal in situ formed resin coating and having a generally cylindrically shaped anode body and a closely adjacent generally cylindrically shaped cap member which encloses the axial anode riser and a portion of an axial anode lead connected to the anode riser.

1 Claim, 7 Drawing Figures

CONFORMALLY EPOXY COATED ELECTROLYTE CAPACITOR HAVING AXIAL LEADS

This invention relates to solid electrolytic capacitors. More particularly the present invention is directed to conformally resin coated solid capacitors formed of anodizeable metal, e.g. tantalum, aluminum, niobium, having longitudinally axial negative and positive lead terminations.

Solid electrolytic capacitors, e.g. such as disclosed in U.S. Pat. No. 3,166,693 are well known and widely used in the electronics industry because of their high volumetric efficiency, solid state construction and general stability. The negative and positive terminations of such capacitor devices can be provided in various configurations. A particularly advantageous configuration is an axial leaded configuration wherein a generally cylindrical capacitor body is provided with a negative lead wire which is soldered to the capacitor body and extends an axial alignment with the longitudinal axis of the capacitor body; the positive lead wire, in such configuration, is welded to the axial anode riser lead of the as formed capacitor body and extends in alignment therewith. As is well known, it is required for most purposes that the capacitor body and adjacent portion of the axial leads be enclosed in an insulating material, e.g. epoxy; however, the axially leaded configuration described above does not lend itself to the convenient formation of a conformal coating by conventional techniques such as dipping, spraying and fluidized bed operations.

It is therefore an object of the present invention to provide a conformally resin coated axially leaded solid electrolytic capacitor device.

Figure 1A:
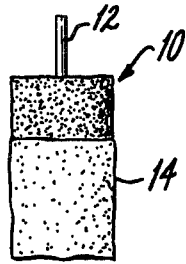
Figure 1B:
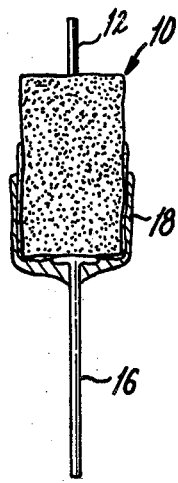
Figure 1C:
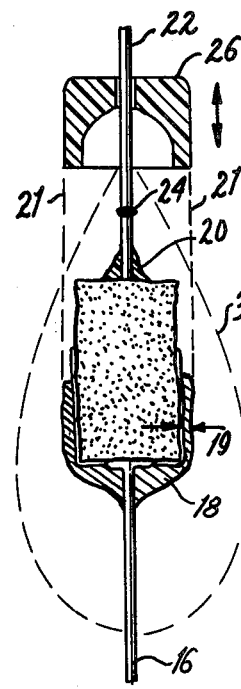
Figure 1D:
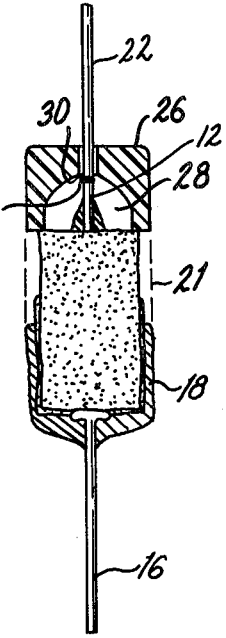
Figure 1E:
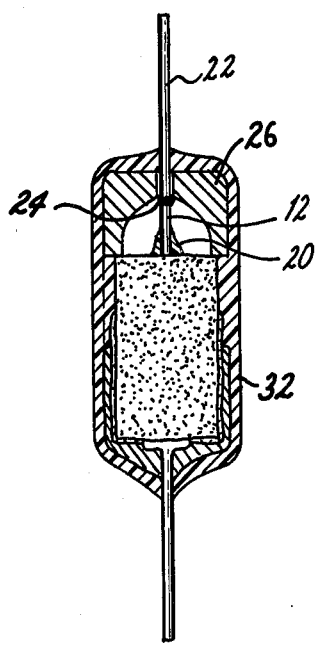
Figure 2:
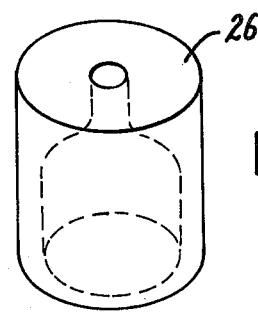
Figure 2A:
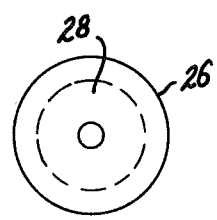

Other objects will be apparent from the following description and claims taken in conjunction with the drawing wherein FIG. 1(a) shows an elevational view of a conventional solid electrolytic capacitor body;

FIGS. 1(b)–1(e) show the procedure of steps forming a capacitor device in accordance with the present invention and FIGS. 2 and 2(a) show a fragmented and plan view of a portion of the cap member of the capacitor device shown in FIGS. 1(c)–1(e).

A capacitor device in accordance with the present invention comprises a generally cylindrical tantalum anode body having a solder coated end portion and an axially aligned negative lead wire joined thereto, an axially aligned anode riser wire extending from the anode body at the end thereof opposite the negative lead wire, an anode lead wire attached to the anode riser wire by means of a weld, the anode lead wire being substantially in alignment with the riser wire, a generally cylindrically shaped cap member formed of electrically insulative material having outer cross-section dimensions substantially the same as the solder coated portion of the anode body, the cap member having an axially aligned passageway which closely, slideably engages the anode lead wire and having an open chamber communicating with the passageway, the open chamber being adjacent the anode body and being adapted to surround the anode riser, the weld and an intermediate portion of the anode lead wire adjacent the weld when slideably moved into contact the the anode body, the cap member being thereby held in axial alignment with the anode body; and a continuous resin coating conformally enclosing the anode body and the cap member in a substantially cylindrical shape, the resin coating being formed in situ by the solidification of a surrounding layer of fluid resin in surrounding contact with the anode body and the cap member, the cap member being slideably moved into contact with the anode body prior to solidification of the epoxy.

With reference to the drawing, a conventional solid, e.g. tantalum electrolytic capacitor body is shown at 10 in FIG. 1 having a conventional axial anode riser lead 12, e.g., made of tantalum wire. The capacitor body 10 has a conventional solder coating 14, e.g., silver or copper which establishes a negative termination for the capacitor body. As shown in FIG. 1(b) an axial negative lead wire 16 is soldered, as indicated at 18, to the negative termination of capacitor body 10. The solder coating 18 increases the outer diameter of the portion of the anode body where it is applied as indicated at 19, thus distorting the generally cylindrical shape of the anode body. A supporting fillet of epoxy can be provided as indicated at 20 if structural support of anode riser wire 12 is considered necessary. An anode lead wire 22, e.g. a solder coated nickel wire, is conventionally welded to the anode riser wire 12 as indicated at 24. Slideably moveable and closely engaged to anode lead wire 22 is a solid cap member 26 which, after the welding of anode riser 12 to anode lead wire 22, is slideably moved to the position shown in FIG. 1(d) closely adjacent to and contacting capacitor body 10. Cap member 26, which is cylindrical in cross-section, has a hollow chamber 28 which, when in place as described above, encloses weld 24 anode riser 12 and an intermediate portion 30 of anode lead wire 22. The outer diameter cap member 26 is substantially the same as that of the solder coated portion of the anode body as indicated at 21. When thus assembled, the above described configuration in symmetrical and substantially cylindrical in shape and is conventionally provided with an in situ formed conformal coating of resin, e.g. by dipping the configuration into a molten thermoplastic material, e.g. polypropylene, and withdrawing the fluid coated capacitor and permitting the coating to solidify. Also, molten unreacted thermosetting epoxy can be used in place of thermoplastic material as can conventional air-drying resin-solvent liquid formulations. Also, the configuration can be contacted with finely sized solid resin particles, e.g. by means of conventional fluidized bed or electrostatic coating techniques with the particles forming a conformal fluid coating by application of heat, which coating solidifies in situ upon cooling. The applied resin forms a coating 32 which solidifies and readily conforms to the symmetrical and cylindrical shape of the above-described assembly of capacitor body and cap, and the resin coating seals the capacitor body and encloses the adjacent portions of the negative lead wire 16, anode lead wire 22 and weld 24 which are within chamber 28.

Without the cap member arrangement 26 as described above, an applied resin coating of the capacitor body would assume a shape similar to shape shown at 35 in FIG. 1(c) which does not conform to cylindrical capacitor body; such a shape is disadvantageous since it is not uniform, leading to possible alignment difficulties in use and relatively little protection against bending is provided for the anode riser lead 12. Cap member 26 is made of suitably made electrically non-conductive materials such as conventional molded epoxy compositions or polysulfone.

What is claimed is:

1. A capacitance device comprising a generally cylindrical solid tantalum anode body having a solder coated end portion of increased outer diameter due to said solder coating and an axially aligned negative lead wire joined thereto, an axially aligned anode riser wire extending from the anode body at the end thereof opposite the negative lead wire, an anode lead wire attached to the anode riser wire by means of a weld, the anode lead wire being substantially in alignment with the riser wire, a generally cylindrically shaped cap member formed of electrically insulative material having outer cross-section dimensions substantially the same as the solder coated end portion of said anode body, and said cap member having an axially aligned passageway which closely, slideably engages said anode lead wire and having an open chamber communicating with said passageway, said open chamber being adjacent said anode body and being adapted to surround said anode riser, said weld and an intermediate portion of said anode lead wire adjacent said weld when slideably moved into contact with said anode body, said cap member being thereby held in axial alignment with said anode body; and a continuous conformal resin coating enclosing said anode body and said cap member in a substantially cylindrical shape and sealing said capacitor body and enclosing within said open chamber said anode riser, said weld and said intermediate portion of said anode wire adjacent said weld, said resin coating being formed in situ by the solidification of a surrounding coating of fluid resin in contact with said anode body and said cap member, said cap member being slideably moved into contact with said anode body prior to solidification of the resin.

* * * * *